United States Patent [19]

Fries, Jr.

[11] Patent Number: 5,013,878
[45] Date of Patent: May 7, 1991

[54] INDUCTION HEAT SEALING LAP-SEAMED CONTAINERS TO NON-METALLIC CLOSURES

[75] Inventor: Carl J. Fries, Jr., Holland, Pa.

[73] Assignee: International Paper Company, Purchase, N.Y.

[21] Appl. No.: 286,824

[22] Filed: Dec. 20, 1988

[51] Int. Cl.$^5$ .............................................. H05B 6/40
[52] U.S. Cl. ............................. 219/10.43; 219/10.53; 219/10.79; 156/69; 156/274.2; 156/380.2
[58] Field of Search ............... 219/10.53, 10.41, 10.43, 219/10.79, 10.75, 10.57, 10.491; 156/69, 272.4, 274.2, 379.7, 380.2

[56] References Cited

U.S. PATENT DOCUMENTS

| | | | |
|---|---|---|---|
| 3,651,299 | 3/1972 | O'Neill | 219/10.53 |
| 3,725,630 | 4/1973 | Gagliardi | 219/10.79 |
| 3,808,074 | 4/1974 | Smith | 156/69 |
| 3,988,185 | 10/1976 | Johnson et al. | 156/69 |
| 4,210,477 | 7/1980 | Gillespie | 219/10.53 X |
| 4,246,461 | 1/1981 | Jeppson | 219/10.53 |
| 4,264,316 | 4/1981 | Knudsen | 219/10.43 X |
| 4,571,472 | 2/1986 | Pollack et al. | 219/10.43 X |
| 4,757,175 | 7/1988 | Mohr et al. | 219/10.79 |

Primary Examiner—Philip H. Leung
Attorney, Agent, or Firm—Walt Thomas Zielinski

[57] ABSTRACT

A method and apparatus for attaching a skirted end closure to a tubular paperboard container, the container having a continuous lapped seam from one end to the other. The interior surface of the container is layered with a thermoplastic, and the container wall includes a layer of metal foil. An annular induction coil is placed near the annular surface of contact between the end closure skirt and an end region of the container interior surface. Upon activation of the induction coil, the metal foil is heated by the usual eddy current effect, to thus soften the thermoplastic and adhere the end closure skirt to the container. The specific improvement in this combination is the addition to the coil of a field intensifier in the region of the lapped seam. The action of the intensifier partially overcomes the lessened heating effect which naturally occurs at the ends of the lapped seam.

18 Claims, 2 Drawing Sheets

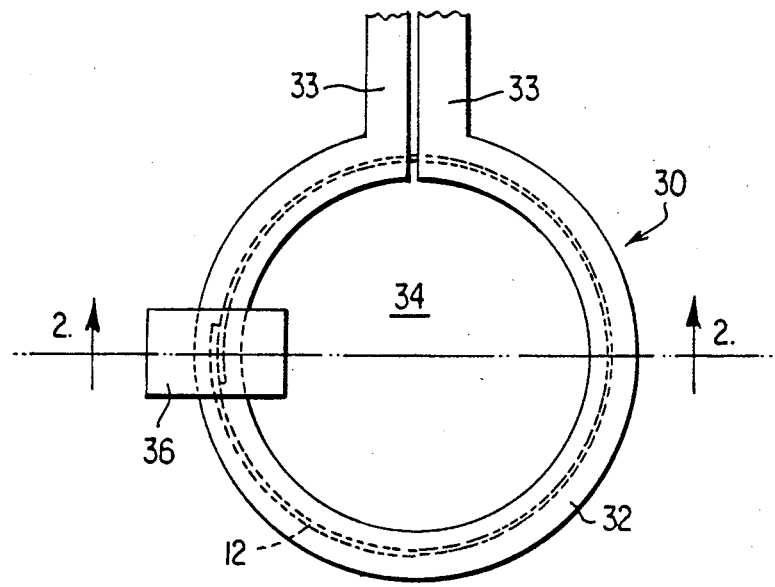
FIG. 1
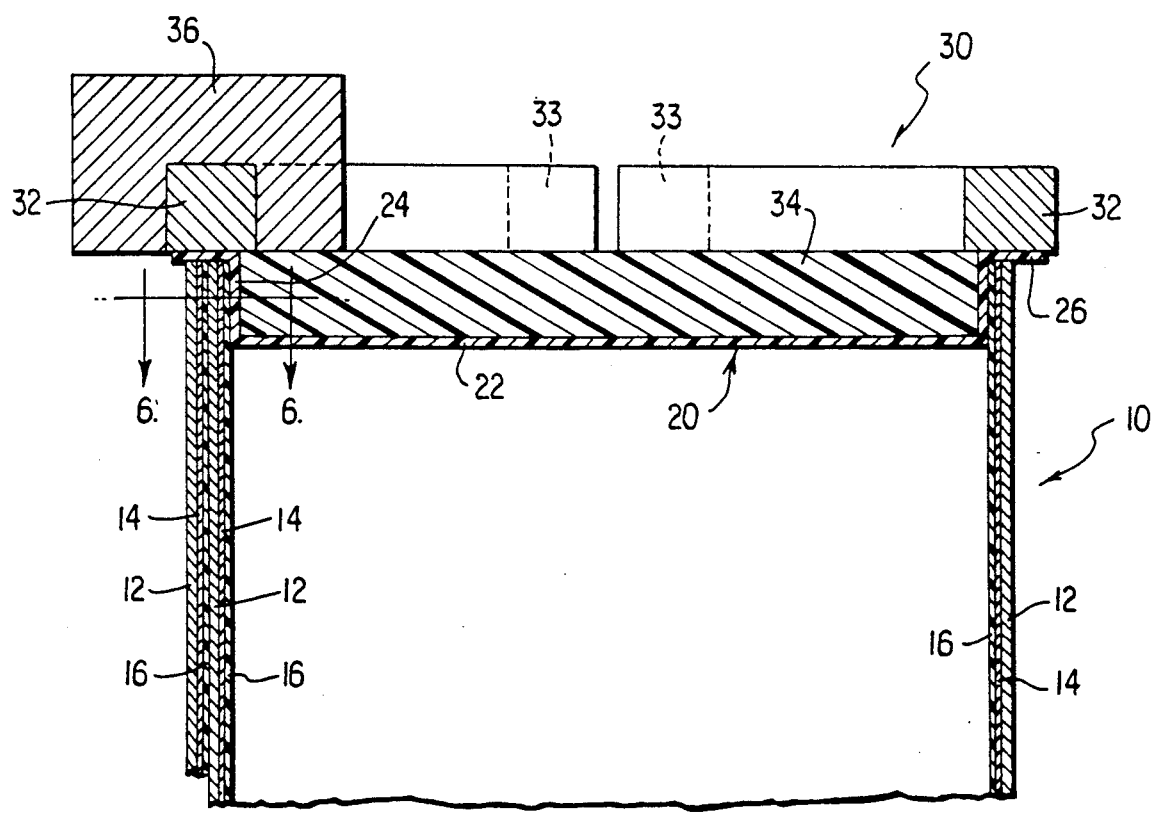
FIG. 2

INDUCTION HEAT SEALING LAP-SEAMED CONTAINERS TO NON-METALLIC CLOSURES

BACKGROUND OF THE INVENTION

This invention relates to an apparatus and method for induction heat sealing lap-seamed tubular paperboard containers to non-metallic closures. The containers are fashioned from paperboard sheet coated at least on its interior forming surface with a layer of a thermoplastic material, such as polyethylene, and also with a metallic foil layer, such as a layer of aluminum foil. The aluminum or other metal foil layer is sandwiched between the polyethylene and the paperboard substrate. Such containers are typically formed by bending a rectangular sheet of the thus laminated material into a tube, the ends of the rectangular sheet being overlapped and sealed together. This construction defines two exterior corners and two interior corners of the tube.

Typically, a non-metallic closure to close one or both ends of the container is fashioned in the form of a plug having a central disc with an upstanding, peripheral skirt. The skirt portion is in surface contact with an interior surface portion of that end of the container which is covered by the closure. In affixing such an end closure to a tubular container, electrical induction heating has sometimes been employed. An induction coil is placed in the proximity of that end of that container which is to be closed, with the end closure positioned within the container end. The induction coil is now energized with the result that eddy currents are induced in the metallic foil coating or layer of the paperboard laminate, the eddy currents causing the usual heating in the metal foil thereof. This in turn causes the polyethylene layer on the interior surface of the tubular paperboard container to partially melt and thereby fuse with the adjacent plastic surface of the end closure which is in surface contact with a portion of the container interior.

Such a method of induction heat sealing yields, however, an incomplete seal between the skirt of the disc closure and the adjacent interior container wall. Experience has shown that eddy currents tend to avoid the corners of the rectangular laminate which forms the tubular container. Accordingly, workers in this art have never been able to obtain an induction heat seal for such a closure to the inside surface at the corner portions of the lap-seamed area of such a laminated paperboard container. At the lap-seam area, two thin aluminum foil surfaces (being the ends of the metal foil coating) are separated by both paperboard and the polyethylene coating. The metal foil coating of a lapped seam tubular container thus defines an extremely thin-walled split sleeve. In theory, this sleeve cannot be completely induction-heated by eddy currents because a complete circuit for eddy current flow is not provided at all regions of the sleeve. The theoretical background for this eddy current behavior is set forth in a text entitled Basics of Induction Heating by Chester A. Tudbury, at page 118. Other portions of this text which are relevant to this invention appear at pages 12 and 13, also incorporated herein by reference.

SUMMARY OF THE INVENTION

According to the practice of this invention, the problem of an incomplete seal between an end closure and a container, both of the type mentioned, is at least partially overcome by providing the induction coil with an intensifier element at that portion of the coil which is adjacent the lap seam of the container. A single turn, so-called pancake coil is used to inductively heat the aluminum foil in the paperboard laminate, to thereby partially melt, by conduction, the polyethylene which is in proximity to the metallic foil. A portion of the closure skirt is also heated. An abutment or back-up member which is fixed with the coil provides pressure against the plastic end closure to force the closure tightly against the inside wall of the container for maximum sealing pressure during the end closure affixing operation. Spring loaded plungers or inserts may be used to release the play from the closure if it sticks in the closure. A U-shaped insert, termed an intensifier, fashioned from a ferromagnetic plastics material is clamped around or otherwise carried by the induction coil only in the area of the lap or side seam area of the container, to thereby concentrate the induction coil energy at this region and direct this energy to the lap seam area to heat the foil at the ends and at the corners of the previously-mentioned thin-wall split sleeve, there being zones or regions where a complete circuit for eddy currents does not exist due to the split in the thin-wall tubular member defined by the metallic foil. This induction coil and intensifier arrangement serves to sufficiently heat-activate, i.e., partially melt, the polyethylene to obtain a heat seal in the noted zones.

The end closure may for example be fashioned completely of a plastics material such as polyethylene, or alternatively, it may be fashioned from paperboard coated with a plastics material such as polyethylene.

BRIEF DESCRIPTION OF THE DRAWINGS

FIG. 1 is a top-plan view illustrating a flat induction coil, of otherwise conventional configuration, provided with the intensifier of this invention.

FIG. 2 is a cross-sectional view taken along section 2—2 of FIG. 1.

DETAILED DESCRIPTION OF THE INVENTION

Figure 3:
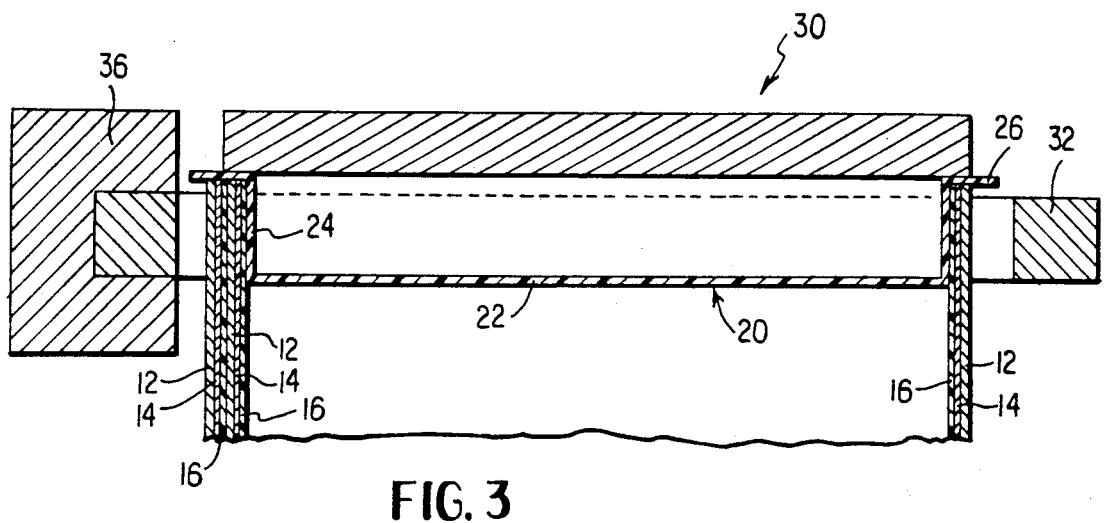
FIG. 3 a view similar to FIG. 2 which illustrates a modification.

Refer now to FIGS. 1 and 2 of the drawings, the numeral 10 denotes generally a tubular container fashioned from paperboard, the paperboard being coated at least on its interior surface with a layer of metallic foil, such as aluminum foil, and a layer of a thermoplastic material, such as polyethylene to thereby form a laminate. The foil is sandwiched between the paperboard and the polyethylene. The container is in a general form of a right circular cylinder having overlapped edges. It can also be of oval or rectangular cross-section as well. The container is typically formed from a rectangular piece of coated paperboard bent so that its ends overlap and have been sealed to thereby form an annular or tube type container, with its bottom end usually being closed. The numeral 12 denotes the paperboard, the numeral 14 the aluminum foil, and the numeral 16 denotes the polyethylene layer.

The numeral 20 denotes generally an end closure, here shown as the upper end closure for the container, and includes a disc 22 carrying at its peripheral portions an upstanding skirt 24 and a horizontally-extending peripheral portion 26 extending radially outward. Closure 20 is formed of a thermoplastic material, such as polyethylene.

The numeral 30 denotes an induction heating coil apparatus according to the practice of this invention, the coil including a generally square in cross-section copper ring 32 having leads 33 (FIG. 1) carrying high-frequency electrical energy to it. The numeral 34 denotes a plastic insert, suitably affixed to the lower portion of coil 32, for pushing the closure 20 tightly against the container interior walls for maximum sealing pressure. The insert 34 travels up and down with coil 32 with each successive closure-applying operation. The numeral 36 denotes an intensifier which tightly fits over coil 32. The material from which intensifier 36 is made may be obtained from Polymer Corp. (Polypenco) and is known as Ferrotron 559H Ferromagnetic Plastic for Induction Hardening.

Turning now to FIG. 3, a modification is illustrated wherein the induction coil 30 is placed around the exterior, upper portion of the container end which is to be sealed with the end closure, and wherein the intensifier 36 is clamped in the indicated manner to it. A similar pusher insert (not illustrated) is employed similar to insert 34 of FIG. 2. The plane defined by the induction coil 32 is substantially coplanar with the plane in which the skirt 24 lies.

Figure 4:
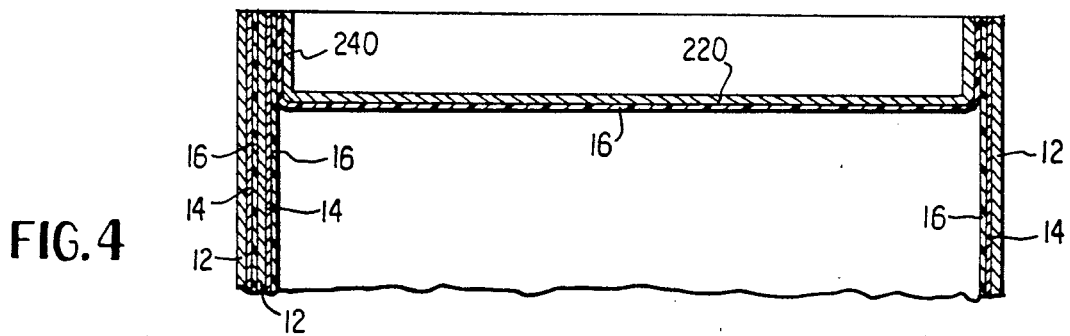
FIG. 4 is a view somewhat similar to FIG. 2, but without the induction coil, and illustrates another embodiment.

FIG. 4 illustrates another embodiment wherein the end closure is defined by a paperboard disc 220 carrying an upstanding skirt 240 and having at least its inner surface coated by a layer 16 of a thermoplastic, such as polyethylene. Thus, the closures of FIGS. 2 and 3 are fashioned completely of a thermoplastic material, while the closure of FIG. 4 is fashioned from paperboard which is coated with a thermoplastic material.

Figure 5:
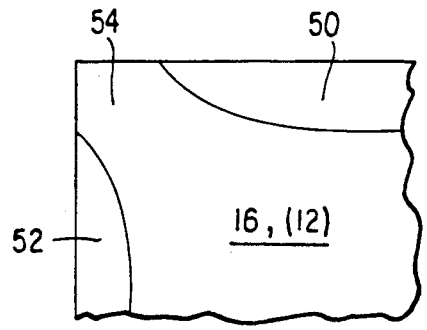
FIG. 5 is a plan view of an inside corner of the tubular container and illustrates an insuffient seal area of the tube forming sheet encountered prior to this innovation.
Figure 6:
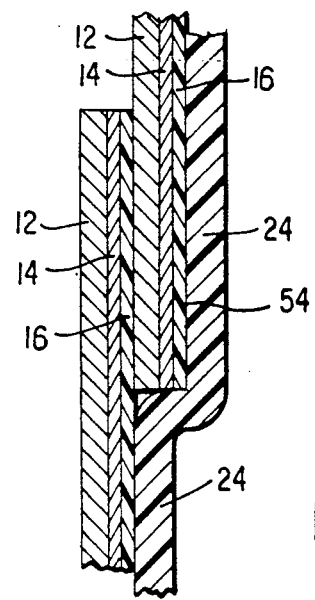
FIG. 6, taken along Section 6—6 of FIG. 2, is a partial transverse cross section of the container and closure skirt.

Referring now to FIG. 5, one inside corner of the container is shown, this corner 54 to be sealed to the skirt portion of the closure disc, along with the upper, interior edge 50 of the rectangular blank which forms the tubular container. The numerals 50 and 52 indicate those zones of the rectangular laminate blank 16, 14, 12 which are satisfactorily heat sealed to the end closure disc skirt 24 by prior art induction sealing apparatus/methods. It is corner portion 54 which, in prior practice, undergoes insufficient induction heating to form the desired, final heat seal with its corresponding, adjacent portion of the closure skirt. The corner 54 is also indicated at FIG. 6 so that the reader can fully visualize the spatial relation between the surface of corner 54, as viewed from the interior of the container, and the closure skirt 24, after these two have been heat sealed together. The action of the intensifier 36 is to make up for the low eddy currents and consequent low heating which ordinarily occur at corner 54.

The mode of operation of the invention is as follows. Referring now to FIGS. 1 and 2, the plastic closure 20 has been placed on top of container 10. Induction coil 30 is then moved down, with plastic insert 34 serving to push it to its lower extreme and tightly press skirt portion 24 against the interior wall of the container. Electrical energy is now supplied to induction ring coil 32. The electromagnetic field produced by the coil causes the generation of eddy currents in the aluminium foil adjacent ring 32. These currents cause the usual $I^2R$ heating effect in the metal foil 14, with the result that the radially innermost layer of polyethylene 16 at the end of container 10 partially melts and becomes fused to the polyethlyene from which skirt 24 of the closure is formed.

The reader will now be in a position to readily visualize that the same intensifier action occurs with the arrangement illustrated at FIG. 3 of the drawings. While the induction coil and intensifier are not shown at FIG. 4, the reader will understand that the same end closure to container end sealing action previously described takes place. It will be apparant from the above description that the end closure may be formed completely of paper.

I claim:

1. A method of induction sealing an end closure to a tubular container, the end closure including a peripheral skirt extending into the container, the skirt being in contact with the interior wall of the container, the tubular container formed from a rectangular blank of paperboard including a metal foil layer and a thermoplastic layer on at least its interior surface, the tubular container having a lapped seam contacted by said skirt, the method including the step of placing an induction heating coil adjacent the container end closure to thereby heat said metal foil and thereby heat and partially melt and fuse the container thermoplastic to the end closure skirt, the induction heating accompanied by simultaneously intensifying the field of the induction heating coil at that portion of the end closure skirt surface in contact with the container interior which is adjacent the lapped seam of the container, whereby the end closure skirt is sealed to the interior of the tubular container at an inside corner of the container adjacent the lapped seam.

2. The method of claaim 1 wherein the end closure is formed completely of a thermoplastic material.

3. The method of claim 1 wherein the end closure is formed of paperboard coated on at least its outer skirt surface with a thermoplastic material.

4. The method of claim 1 wherein the end closure is formed completely of paperboard.

5. The method of claim 1 wherein the induction heating coil is placed adjacent the top of the container and is of substantially the same contour as that of the container.

6. The method of claim 1 wherein the induction heating coil is of a greater diameter than that of the container and wherein the induction coil is substantially coplanar with a plane in which the end closure skirt lies.

7. A combination for induction heat sealing, the combination including an end closure having a skirt, a tubular paperboard container having a lapped seam along its length, the container having a layer of metal foil in its wall and a layer of a thermoplastic material on its inner surface, the end closure skirt contacting an end inner wall portion of the container, an annular induction coil adjacent the end of the container to be provided with the end closure, and a means for intensifying the field radiated by the induction coil immediately adjacent the lapped seam of the container relative to the other portions of the container wall, said means being located adjacent to the coil, end closures, and lapped seam.

8. The combination of claim 7 wherein the intensifier is generally U-shaped and is mounted on the coil.

9. The combination of claim 7 wherein the diameter of the coil is greater than the diameter of the container.

10. A method of induction sealing an end closure to a container, the end closure including a skirt, the container formed from a paperboard including a metal foil layer and a thermoplastic layer on at least its interior surface and having a lapped seam contacted by said skirt, the method including the step of placing an induction heating coil adjacent the container end closure to thereby heat said metal foil and thereby heat and partially melt and fuse the container thermoplastic to the end closure skirt, the induction heating accompanied by simultaneously intensifying the field of the induction heating coil at that portion of the end closure skirt surface in contact with the container which is adjacent the lapped seam of the container, whereby the end closure skirt is sealed to the container adjacent the lapped seam.

11. The method of claim 10 wherein the end closure is formed completely of a thermoplastic material.

12. The method of claim 10 wherein the end closure is formed of paperboard coated on at least its outer skirt surface with a thermoplastic material.

13. The method of claim 10 wherein the end closure is formed completely of paperboard.

14. The method of claim 10 wherein the induction heating coil is placed adjacent the top of the container and is of substantially the same contour as that of the container.

15. The method of claim 10 wherein the induction heating coil is of a greater diameter than that of the container and wherein the induction coil is substantially coplanar with a plane in which the end closure skirt lies.

16. A combination for induction heat sealing, the combination including an end closure having a skirt, a paperboard container having a lapped seam along its length, the container having a layer of metal foil in its wall and a layer of a thermoplastic material on its inner surface, the end closure skirt contacting an end inner wall portion of the container, an annular induction coil adjacent the end of the container to be provided with the end closure, a field intensifier adjacent the coil and angularly located adjacent the lapped seam of the container.

17. The combination of claim 16 wherein the intensifier is generally U-shaped and is mounted on the coil.

18. The combination of claim 17 wherein the diameter of the coil is greater than the diameter of the container.

* * * * *